A. & S. WYNBERG.
APPARATUS FOR TREATING SUGAR CANE.
APPLICATION FILED FEB. 16, 1909.
958,790.
Patented May 24, 1910.
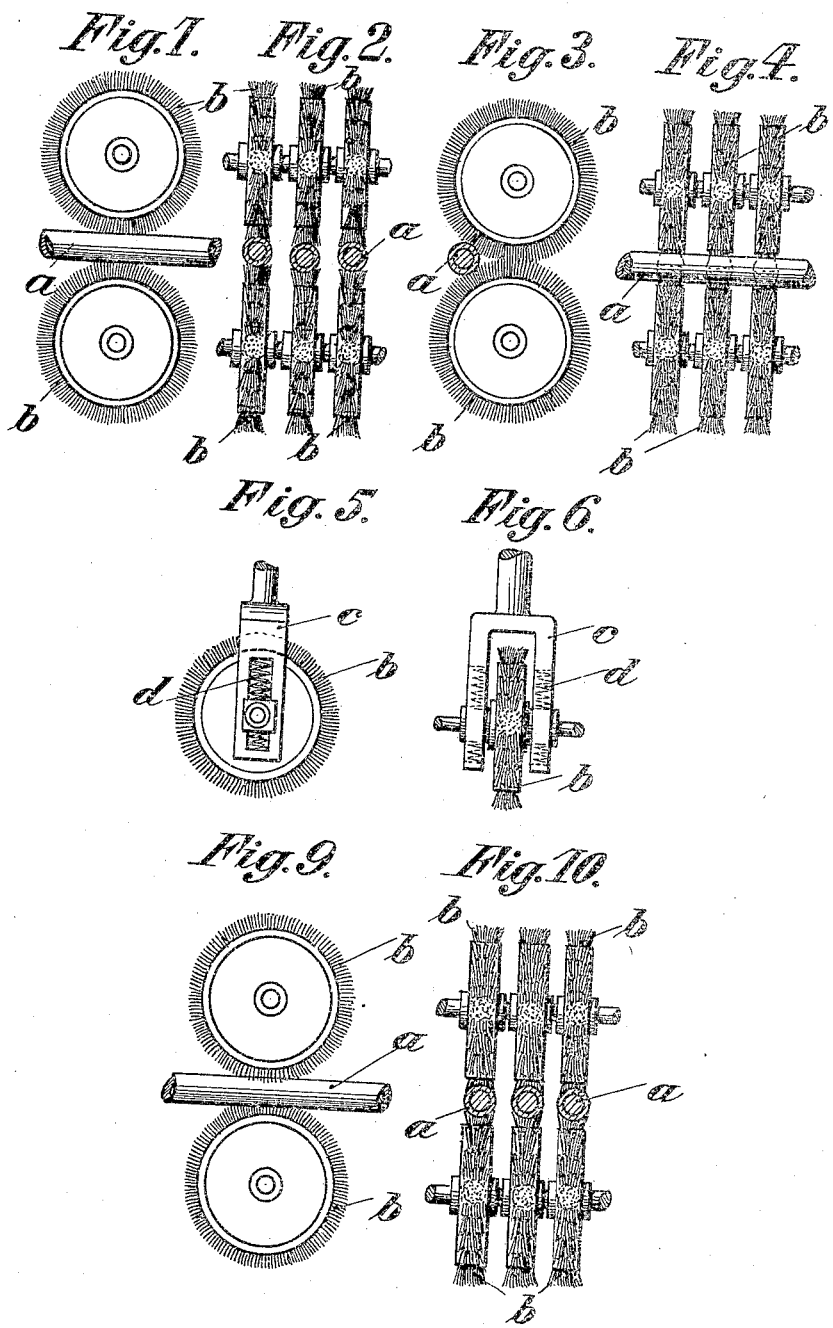

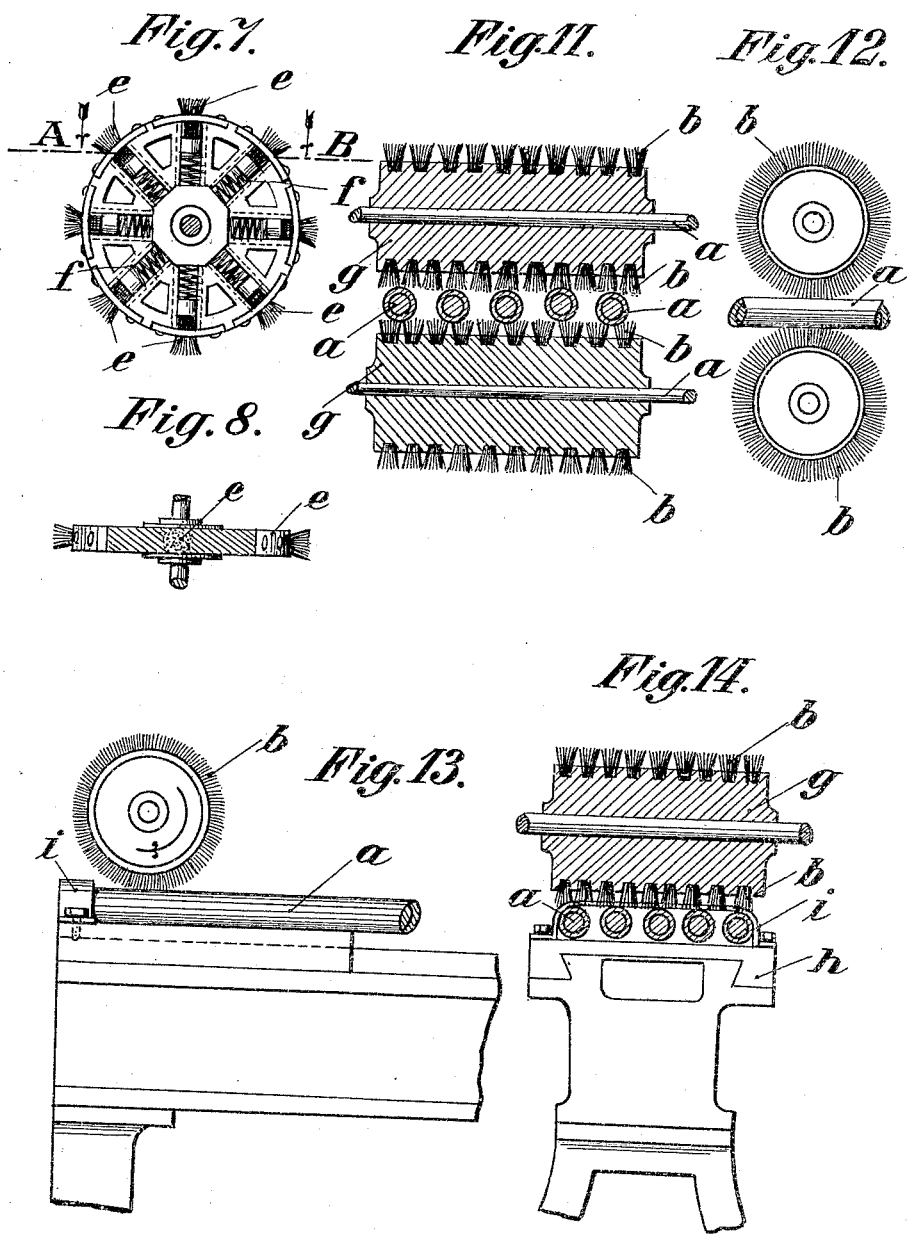

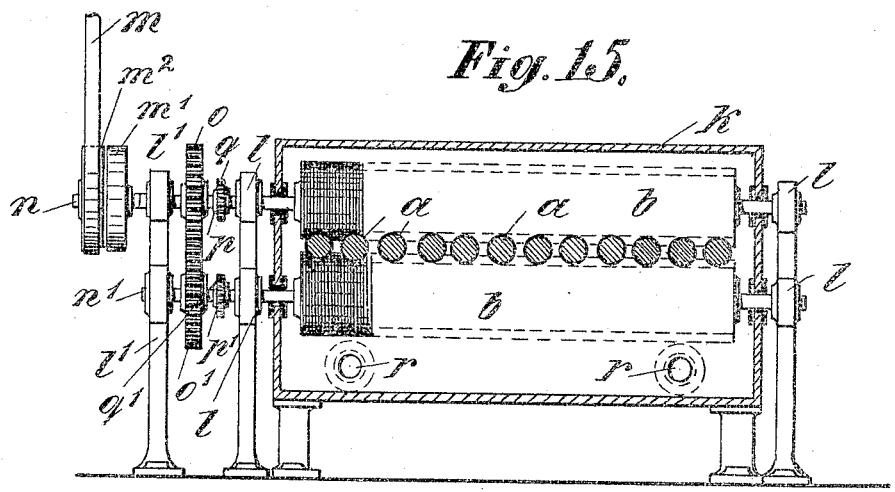
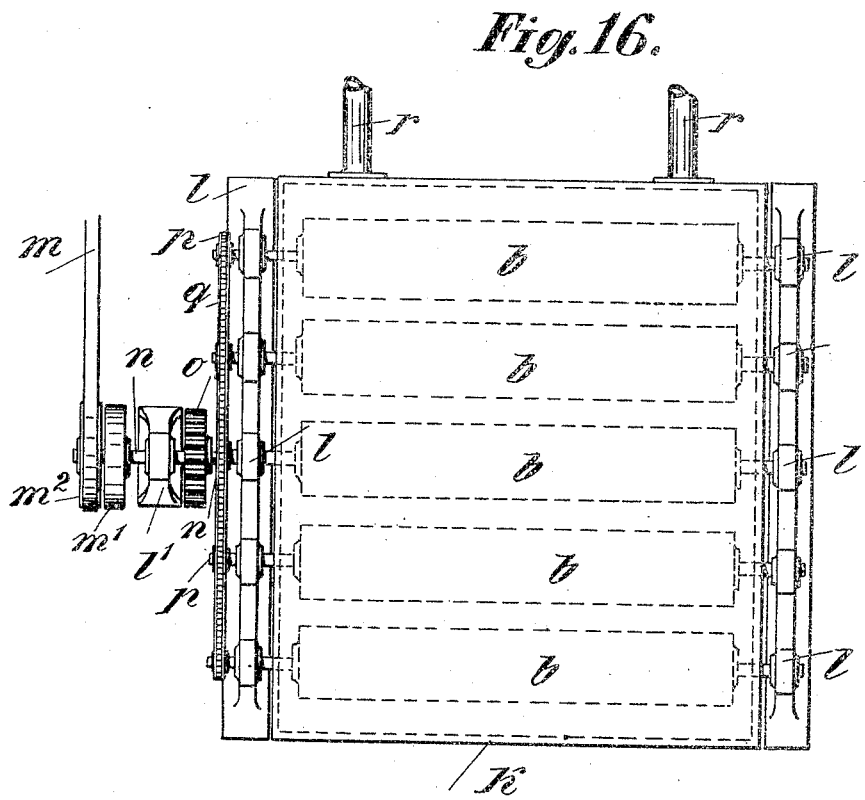

UNITED STATES PATENT OFFICE.

ABRAHAM WYNBERG AND SIMON WYNBERG, OF AMSTERDAM, NETHERLANDS.

APPARATUS FOR TREATING SUGAR-CANE.

958,790.   Specification of Letters Patent.   Patented May 24, 1910.

Application filed February 16, 1909. Serial No. 478,260.

*To all whom it may concern:*

Be it known that we, ABRAHAM WYNBERG, diplomated technologue, and SIMON WYNBERG, engineer, citizens of Netherlands, subjects of the Queen of Netherlands, residing at Amsterdam, Heerengracht 567 and Kwakersplein 9, in the Kingdom of Netherlands, have invented certain new and useful Improvements in Apparatus for Treating Sugar-Cane, of which the following is a full, clear, and exact description.

In the cane sugar industry according to the manufacturing methods used hitherto, the cane is submitted in its natural state to the operations required for the purpose of producing the sugar, that is, the sugar cane with the natural wax on its surface and with all the impurities of the natural plant is brought to the mills to be crushed and submitted to further treatment. The objection to this method of manufacture is that the wax passes into the juice, where its presence has been found very disadvantageous, more especially during the process of filtering and crystallization of the sugar, as the wax not only prevents a proper and thorough crystallization, but fills up or chokes the filter cloth, and by surrounding the individual elements or grains of sugar in the juice causes a loss of sugar.

These difficulties can be avoided by previously freeing the sugar cane wax; and it is the object of the present invention to provide a machine or apparatus for loosening and removing the wax and other impurities from the sugar cane in a manner suitable for industrial exploitation on a large scale, thereby not only obtaining a sugar cane thoroughly freed from wax and impurities prior to its being submitted to the operation of the mill or crushers, with a corresponding gain in the quantity of sugar extracted; but also recovering the valuable wax.

Apparatus suitable for carrying out this process is illustrated in the accompanying drawings.

Figure 17:
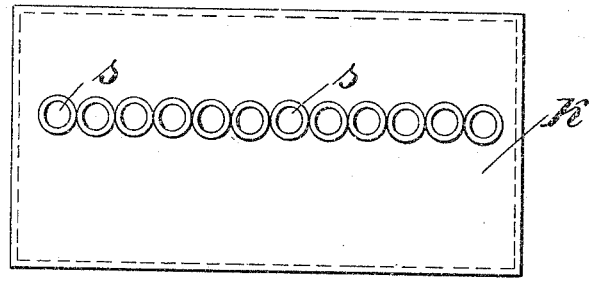
Figure 18:
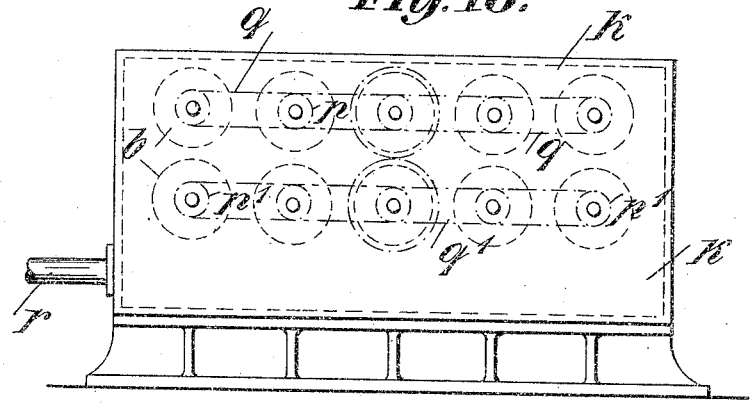
Figure 19:
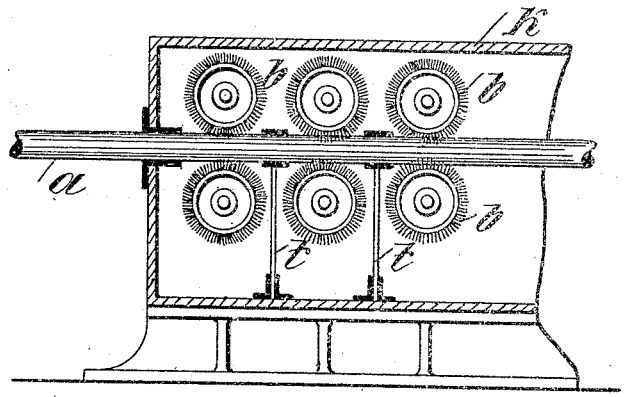

Figure 1 shows a side view of one form of apparatus, arranged to permit the cane to be fed lengthwise therethrough; Fig. 2 is an end view of the apparatus shown in Fig. 1; Fig. 3 is a side view of a similar apparatus arranged to permit the cane to be fed sidewise therethrough. Fig. 4 is an end view of the apparatus shown in Fig. 3; Fig. 5 is a side view of a resiliently journaled brush; Fig. 6 is a front view of Fig. 5; Fig. 7 is a side view of a rigidly journaled brush consisting of single or individual resiliently arranged bundles of brushes; Fig. 8 is a horizontal section and partial plan view on the line A—B of Fig. 7; Fig. 9 is a side view of rigidly journaled pairs of brushes with fluted profiles arranged on one axle; Fig. 10 is an end view of Fig. 9; Fig. 11 is a vertical section through a pair of brushes; Fig. 12 is a side view of Fig. 11; Fig. 13 is a side view of a brush moving to and fro, the reciprocating means being not shown, and consisting of bundles of brushes arranged on a common or joint axle and of a rigidly fixed working table; Fig. 14 is a transverse vertical section of Fig. 13 through the brush axle; Fig. 15 shows an arrangement of the stationary brushes in a machine, the machine partially in section and partially in front view; Fig. 16 is a plan view of the machine shown in Fig. 15; Fig. 17 is a front view of the front and back wall of the casing of the machine shown in Fig. 15; Fig. 18 is a side view of the machine shown in Fig. 15; Fig. 19 is a vertical section partly in elevation through the machine shown in Fig. 18.

As will be seen from the figures, the forms of construction of this invention can be divided into two main groups, the first group comprising stationary wax-removing devices and devices for moving the stalks of sugar-cane, and the second group comprising devices for moving the brushes with stationary devices for receiving the stalks of sugar-cane. The wax-removing devices (brushes) themselves can be divided into rigidly and resiliently journaled brushes, while the profile of the brushes may vary. The movement of the brushes is rotary or to and fro.

Figs. 1 to 4 show an arrangement of a brush consisting of several rigidly journaled pairs of brushes between which the sugar cane to be worked is placed lengthwise or sidewise. This arrangement is to be recommended for a very uniform sugar cane varying very little in thickness. For a less uniform sugar cane the construction of the brushes or pairs of brushes, shown in Figs. 5–8, is better suited.

According to Figs. 5 and 6 the brush *b* is journaled in a bifurcation *c* of the brushholder, in such a manner that the prongs or shanks of the fork are provided with recesses in which move the sliding-pieces of the axles of the brushes, being supported by springs $d$ placed into the same. The springs are preferably very resilient in order to make the distance of the brushes suit in every case the thickness of the sugar cane. The profile of the brush can likewise be made to match the shape of the cane, as shown in Figs. 7–10.

The brush illustrated in Figs. 7 and 8 consists of a disk, in whose radial groove are arranged the single bundles $e$ of the brush. In these grooves are arranged the springs $f$ which press the brushes with a gentle pressure against the cane to be worked.

Figs. 9 and 10 show a modification of the profile of the brush $b$ in which the brush is fluted or grooved. The advantage of such a construction lies in the uniform pressure of the brush, in consequence of which the cane is worked uniformly all over. The brushes or pairs of brushes can be arranged in a row on a machine by placing the bundles or collars on a common shaft or by placing the single brushes side by side or one behind the other, on axles. In Figs. 11–14 there are placed individual bundles $b$ of brushes upon a common axle $g$, the cane being below or between the brushes.

As already mentioned, the tool can either be moved and the piece to be worked be stationary, or the tool may be stationary and the piece to be worked be moved.

Figs. 13 and 14 show a form of construction with moving brushes $b$ and stationary cane $a$. The cane to be worked is placed upon the support $h$ of the working table $k$ of the machine and secured by clamps $i$ or the like.

In the following figures are illustrated sample forms of construction for machines in combination with which the above described kinds of wax-removing devices (brushes) are used.

Figs. 15–19 show a machine with five parallel stationary pairs of brushes, in which all brushes are positively driven, while the cane moves between the brushes.

The brushes $b$ are arranged in a casing $k$ and rotate in bearings $l$. They are driven by belts with a fast and loose pulley $m^1$ and $m^2$. The belt-pulleys are seated on the shaft $n$ on which the middle upper brush $b$ is also arranged. In order to transmit the movement of the upper brush to the lower brush pertaining to it, there are arranged between the bearings $l$ and $l'$ on the shafts $n$ and $n'$ two toothed wheels $o$ and $o'$ of the same size. The middle pair of brushes is thus positively driven. This middle pair of brushes serves at the same time for actuating the other pairs of wax-removing devices or brushes. To this end there are keyed to the shafts of all brushes two toothed wheels $p$ and $p'$ of the same size, over which are placed chains $q$ and $q'$. Instead of the chain-gear there may also be used a bevel-wheel or belt gear.

The front and back walls of the casing $k$, Fig. 17, are each provided with openings $s$ through which the cane $a$ is passed. The intermediate holders $t$ arranged in the inside of the casing $k$ (Fig. 19) serve for guiding the cane. By means of the pipes $r$ the casing $k$ is connected with a blower or suction device which may be of any usual construction, the collected wax being delivered to any suitable receptacle.

The object of the brushing is the following: When the brushes pass over the cane to be treated, or the cane passes through the brushes, the particles of wax and other substances adhering to the cane are removed by the bristles or hairs of the brushes and collected by the above-mentioned suction or blowing device. The sugar cane cleaned in this way, yields more sugar than the cane treated by the processes hitherto in use.

What we claim is:

1. A machine for removing wax from sugar cane stalks comprising a brush, means coöperating therewith for supporting the cane stalk so that its exterior surface is engaged by the brush, means for imparting movements relative to each other to the brush and the stalk and means for collecting the wax.

2. A machine for removing wax from sugar cane stalks comprising a rotary brush, means coöperating therewith for supporting the cane stalk so that its exterior surface is engaged by the brush, means for rotating the brush and means for collecting the wax.

3. A machine for removing wax from sugar-cane stalks, comprising a casing, rotary brushes therein, means for rotating the brushes, and means for supporting the cane so that the exterior surfaces are engaged by the brushes, said means comprising guides formed in the wall of the casing.

4. A machine for removing wax from sugar-cane stalks, comprising a casing, rotary brushes therein, means for rotating the brushes, and means for supporting the cane so that the exterior surfaces are engaged by the brushes, said means comprising guides formed in the wall of the casing and supplemental guides within the casing.

In witness whereof, we subscribe our signatures, in presence of two witnesses.

ABRAHAM WYNBERG.
SIMON WYNBERG.

Witnesses:
P. H. GROOST,
V. H. HUESHOFF.